United States Patent
Ekman et al.

(10) Patent No.: US 9,004,910 B2
(45) Date of Patent: Apr. 14, 2015

(54) METHOD FOR COMBUSTION OF A LOW-GRADE FUEL

(75) Inventors: Tomas Ekman, Saltsjö-Boo (SE);
Anders Lugnet, Rimbo (SE); Ola Ritzén, Akersberga (SE)

(73) Assignee: Linde AG, Munich (DE)

(*) Notice: Subject to any disclaimer, the term of this patent is extended or adjusted under 35 U.S.C. 154(b) by 1107 days.

(21) Appl. No.: 13/020,147

(22) Filed: Feb. 3, 2011

(65) Prior Publication Data

US 2011/0195366 A1    Aug. 11, 2011

(30) Foreign Application Priority Data

Feb. 5, 2010   (SE) .................................... 1050114

(51) Int. Cl.
*F23G 7/06* (2006.01)

(52) U.S. Cl.
CPC ...... *F23G 7/061* (2013.01); *F23D 2900/00006* (2013.01); *F23G 2209/14* (2013.01); *Y02E 20/344* (2013.01)

(58) Field of Classification Search
CPC ........... F23G 7/065; F23G 7/06; F23C 10/18; F23C 2202/00; F23C 2202/10
USPC .............................................. 431/5, 215, 170
See application file for complete search history.

(56) References Cited

U.S. PATENT DOCUMENTS

| | | | |
|---|---|---|---|
| 3,592,630 A * | 7/1971 | Willett | 75/387 |
| 3,945,942 A * | 3/1976 | Marion et al. | 48/198.1 |
| 4,844,737 A * | 7/1989 | Oono et al. | 75/460 |
| 4,887,800 A * | 12/1989 | Hotta et al. | 266/270 |
| 5,033,958 A * | 7/1991 | Palz | 431/179 |
| 5,066,327 A * | 11/1991 | Yanaka et al. | 75/770 |
| 5,234,490 A * | 8/1993 | Kundrat | 75/464 |
| 6,200,128 B1* | 3/2001 | Kobayashi | 431/5 |
| 6,432,565 B1* | 8/2002 | Haines | 429/416 |
| 7,008,219 B2* | 3/2006 | Shimada et al. | 431/215 |

* cited by examiner

*Primary Examiner* — Avinash Savani
(74) *Attorney, Agent, or Firm* — Young & Thompson

(57) ABSTRACT

Method for combustion of a fuel uses an existing air burner (1), including a first supply opening (5) for fuel and a second supply opening (7) for air, which supply openings (5,7) open out into a combustion zone (3). The method is characterised in that a gaseous fuel with an LHV (Lower Heating Value) of less than 7.5 MJ/Nm$^3$ is supplied through the second supply opening (7), in that an oxidant including at least 85 percent by weight oxygen is also supplied to the combustion zone (3) through a supply device for oxidant, and in that the gaseous fuel is caused to be combusted with the oxidant in the combustion zone (3).

16 Claims, 1 Drawing Sheet

METHOD FOR COMBUSTION OF A LOW-GRADE FUEL

BACKGROUND OF THE INVENTION

Figure 1:
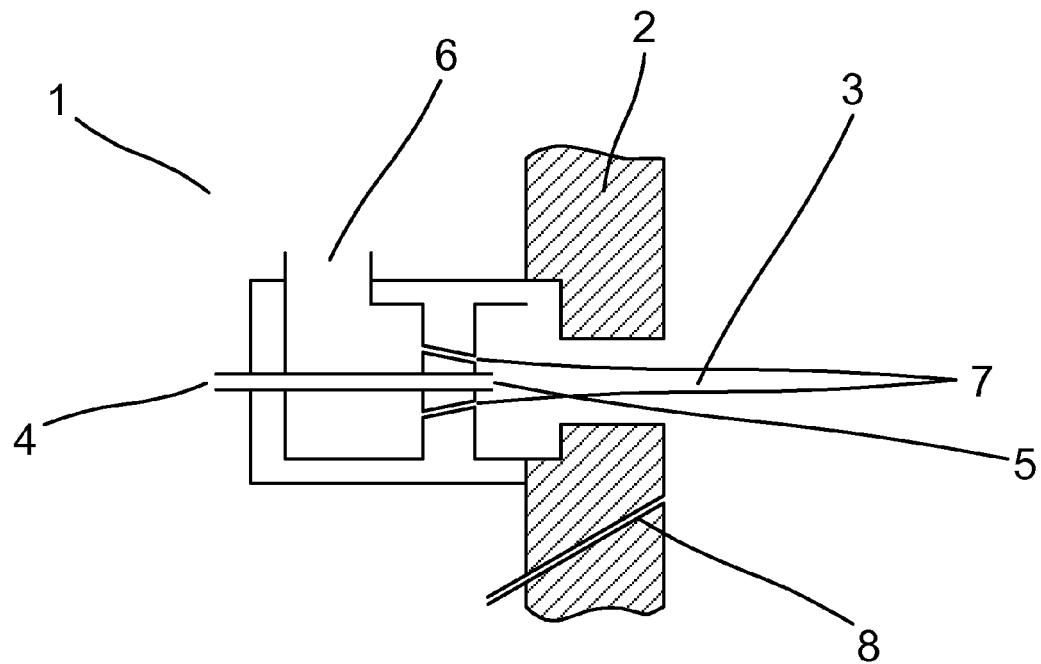

The present invention relates to a method for combustion of a fuel in a furnace. Specifically, the invention relates to a method for combustion of a low-grade fuel.

DESCRIPTION OF THE RELATED ART

In plants in which industrial furnaces are used to produce steel and other metals, various low-grade, gaseous fuels are often produced as byproducts. One example is so-called top gas from blast furnaces, which are used in steel production. Another example is converter off-gases. Such low-grade fuels typically comprise a mixture of compounds, for example comprising various hydrocarbons, nitrogen, oxygen, hydrogen, carbon monoxide, carbon dioxide and water vapour. Because of the often limited energy density in such fuels, they are conventionally used for low temperature processes such as heating or in power plants. Alternatively, they may be mixed with fuels with higher energy density.

Since such low-grade fuels are often produced in abundance in for example steel plants, and therefore are comparatively inexpensive, it would be desirable to be able to use them to a greater extent also in high temperature processes, in which high-grade fuels are normally required. Today, they are often burnt and escape to the atmosphere to no use.

SUMMARY OF THE INVENTION

The present invention solves the above described problems.

Thus, the present invention relates to a method for combustion of a fuel using an existing air burner, which air burner comprises a first supply opening for fuel and a second supply opening for air, which supply openings open out into a combustion zone, and is characterised in that a gaseous fuel with an LHV (Lower Heating Value) of less than 7.5 MJ/Nm$^3$ is supplied through the second supply opening, in that an oxidant comprising at least 85 percentages by weight oxygen is also supplied to the combustion zone through a supply device for oxidant, and in that the gaseous fuel is caused to be combusted with the oxidant in the combustion zone.

BRIEF DESCRIPTION OF THE DRAWING FIGURES

Figure 2:
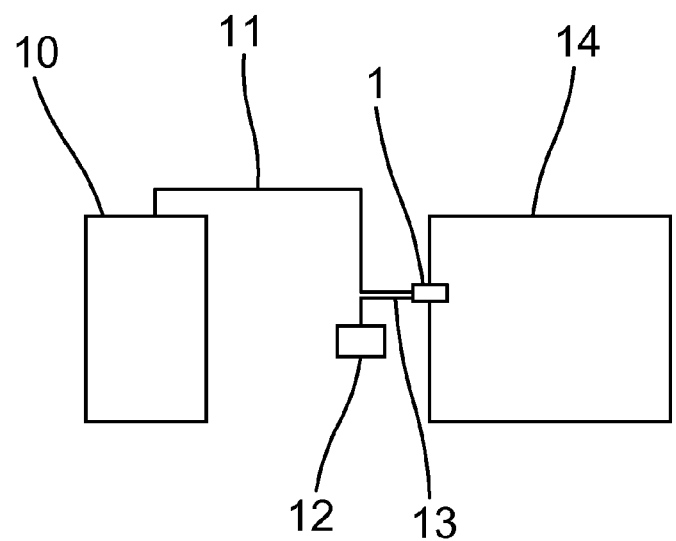

In the following, the invention will be described in detail, with reference to exemplifying embodiments of the invention and to the enclosed drawings, in which:

FIG. 1 is an outline diagram of an air burner used with a method according to the present invention; and FIG. 2 is an outline diagram of a blast furnace and an industrial furnace arranged in the same steel plant.

DETAILED DESCRIPTION OF THE INVENTION

Thus, FIG. 1 illustrates an air burner 1, which is conventional as such and which during conventional operation is used to heat an industrial furnace. The air burner 1 is mounted in a furnace wall 2 of the industrial furnace. The air burner 1 is arranged to, during conventional operation, combust a fuel in a combustion zone 3 with an oxidant which is air. During such conventional operation, the fuel is supplied by the air burner 1 through a supply conduit 4, and is supplied to the combustion zone 3 via a supply opening 5 for fuel. The air is supplied in a corresponding manner through a respective supply conduit 6 and respective supply openings 7 for air.

The air burner 1 can also be designed in other ways, which designs are conventional per se, such as with one or several supply openings for fuel and with one or several supply openings for air. The fuel used for conventional operation can be a liquid or gaseous fuel. The conventional fuel is a high- or medium-grade fuel such as liquefied petroleum gas, natural gas or coke-oven gas.

According to the invention, the air burner 1 is not operated with the conventional, high- or medium-grade fuel, but instead using a gaseous, low-grade fuel such as top gas from a blast furnace.

Table 1 is a comparison of typical contents of various constituents between, on the one hand, a medium-grade fuel such as coke-oven gas and, on the other hand, a low-grade fuel such as top gas from a blast furnace as well as off-gas from a converter. All values are given as percentages by volume.

TABLE 1

|  | $N_2$ | $O_2$ | $H_2$ | CO | $CO_2$ | $CH_4$ | $C_mH_n$ | $H_2O$ |
|---|---|---|---|---|---|---|---|---|
| Coke-oven gas | 3.5 | 0.55 | 60 | 7.5 | 2.35 | 23.5 | 2.4 | 0.2 |
| Top gas | 52.5 | 0.55 | 2.3 | 23.5 | 20 | — | — | 1.15 |
| Off-gas | 17.2 | 0.1 | 2.5 | 64.5 | 15.6 | — | — | 0.1 |

Table 2 is a comparison of Lower Heating Values (LHV) for coke-oven gas, top gas from a blast furnace and converter off-gas.

TABLE 2

|  | LHV (MJ/Nm$^3$) | LHV (MJ/kg) |
|---|---|---|
| Coke-oven gas | 17.9 | 8.2 |
| Top gas | 3.2 | 4.3 |
| Off-gas | 7.5 | 10.4 |

According to the invention, the conventional air burner 1 is driven with a gaseous fuel the LHV of which is equal to or less than 7.5 MJ/Nm$^3$. The fuel can comprise a certain admixture of another, more high-grade fuel, as long as the LHV of the mixture does not exceed 7.5 MJ/Nm$^3$. However, for cost reasons it is preferred not to admix high-grade fuels prior to combustion.

In order to compensate for the inferior heating value of the fuel in comparison to the conventionally used fuel, the conventional air burner 1 is not driven with air as the oxidant, but with an oxidant having a higher oxygen content than air. Preferably, the oxidant comprises at least 85 percentages by weight oxygen, and most preferably at least 95 percentages by weight oxygen.

By combusting a low-grade, gaseous fuel with such an oxidant, flame temperatures and flue gas volumes essentially corresponding to those produced during conventional combustion of high-grade fuels can be achieved at corresponding combustion powers. Thereby, low-grade, inexpensive fuels of the type top gas from blast furnaces can be used with adequate process results, for heating of the industrial furnace. It is preferred, especially in the case of top gas, that the amount fuel supplied per time unit is caused to essentially correspond to the amount air supplied during conventional operation of the air burner. In other words, it is preferred that the volume amount low-grade fuel supplied per time unit at a certain predetermined combustion power is between 0.5 and 2.0, more preferably between 0.5 and 1.5, times the volume amount of air during conventional operation of the air burner with the same combustion power. It is especially preferred that the amount of low-grade fuel supplied per time unit at a certain predetermined combustion power is the same as the amount, ±10 percentages by volume, of air supplied during conventional operation of the air burner with the same combustion power.

According to the invention, the low-grade fuel is supplied to the combustion zone 3 through the conventional supply opening 7 for air. It is also preferred, albeit not necessary, that the supply to the supply opening 7 takes place through the existing supply conduit 6 for air. Since the volume flow of low-grade fuel per power unit is relatively close to that of the air flow per power unit during combustion of conventional high-grade fuels, the conventional supply conduit 6 and the conventional supply opening or supply openings 7 for air can be used without any major modifications, possibly with no modifications at all. This results in that the conventional air burner 1 can be converted for operation with a low-grade, inexpensive fuel instead of the conventional, high-grade fuel, without the change requiring any expensive installation work.

Moreover, this results in the possibility of flexible operation depending on the access to various types of fuels.

The oxidant is also supplied to the combustion zone 3, and the low-grade fuel is combusted together with the oxidant therein.

According to a first preferred embodiment, the oxidant is supplied through the existing supply opening 5 for fuel, preferably through the existing supply conduit 4 for fuel.

According to a second preferred embodiment, the oxidant is supplied to the combustion zone 3 through an additional supply device 8, the supply opening of which is arranged at a distance from both the existing supply opening for fuel 5 and that for air 7, preferably arranged at a distance from the orifice of the air burner 1. This results in the advantage that one and the same existing air burner can be adapted for achieving either a normal flame or a flameless combustion, by arranging several different injection points for supply of oxidant to the combustion zone 3.

According to a third preferred embodiment, the oxidant is supplied partly through the existing supply opening 5 for fuel, and is supplemented by an additional supply, via the supply device 8, to an extent large enough for the desired stoichiometric conditions to prevail in the combustion zone 3.

It is preferred that the oxidant is supplied through a lance which is adapted for the supply of oxidant. Such a lance can for example be arranged to run inside the existing supply conduit 4 for fuel and opening out at a place near the existing supply opening 5 for fuel. Alternatively or additionally, the additionally arranged supply device 8 may comprise such a lance.

Furthermore, it is preferred that a high- or medium-grade fuel is injected into the combustion zone 3 in an initial boosting step of the operation of the burner 1 according to the invention, and is there ignited in order to start the combustion reaction between the low-grade fuel and the oxidant. The injection can be carried out via the existing air burner 1, for example through the existing supply opening for air 7 or through the existing supply opening for fuel 5.

It is also preferred, in case the air burner 1 comprises a recuperator (not shown), which is conventional per se, for recovery of thermal energy by preheating of the combustion air supplied through the supply opening 7, that the recuperator during operation according to the invention is connected to the stream of supplied low-grade fuel, so that the fuel is preheated. This results in better combustion economy with no cost-driving extra installations.

FIG. 2 illustrates schematically an industrial furnace 14 being heated by the use of the conventional air burner 1. During operation according to one preferred embodiment of the present invention, an oxidant with high oxygen contents is fed from an oxidant supply device 12 to the burner 1 via a w conduit 13, and is there supplied to the combustion zone as described above. The fuel is led to the burner 1, via another conduit 11, from a blast furnace 10. The fuel which is led from the blast furnace 10 consists of top gas, which is produced during operation of the blast furnace 10. Possibly, this top gas is mixed with an additional gaseous fuel, preferably one or several low-grade fuels. It is preferred that at least half of the combustion energy supplied from the burner 1 originates from top gas from a blast furnace.

Moreover, it is preferred that at least half of, or more preferably all of, the low-grade fuel or fuels that are combusted in the burner 1 has or have been produced at, and therefore originates or originate from, operation of equipment arranged in the same industrial plant as the one in which the burner 1 is installed for operation. It is especially preferred that the fuel consists of top gas originating from operation of the blast furnace 10, which is arranged in the same industrial plant as the burner 1.

Such a method results in that energy recapture can take place within the same plant, but also that the total cost of operations for the plant can be kept down and that the need for expensive transports can be reduced.

It is preferred that the burner 1 is operated for heating of the industrial furnace 14 to a temperature exceeding 500° C., more preferably exceeding 700° C., most preferably exceeding 800° C. It is also preferred that the industrial furnace 14 is operated as one of several steps for the production or treatment of a metal, preferably steel. It is especially preferred that the industrial furnace 14 constitutes or is comprised in a walking beam furnace, an annealing line or a step for preheating of ladles.

Above, preferred embodiments have been described. However, it is apparent to the skilled person that numerous modifications can be made to the described embodiments without departing from the idea of the invention.

By way of example, several different types of units, of the same class as a blast furnace, giving rise to low-grade, gaseous fuels, may be connected to one or several conventional air burners.

Thus, the invention shall not be limited to the described embodiments, but may be varied within the scope of the appended claims.

The invention claimed is:

1. A method for combustion of a fuel, the method comprising the steps of:
    using an existing air burner (1), which air burner (1) comprises a first supply opening (5) for fuel and a second supply opening (7) for air, which first and second supply openings (5,7) open out into a combustion zone (3),
    supplying a gaseous low-grade fuel with a lower heating value (LHV) of less than 7.5 MJ/Nm$^3$ through the second supply opening (7) for air,
    supplying an oxidant comprising at least 85 percent by weight oxygen to the combustion zone (3) through a supply device for oxidant, and causing the gaseous low-grade fuel to be combusted with the oxidant in the combustion zone (3),
    wherein the supply device for oxidant is caused to comprise a lance adapted for supply of oxidant.

2. The method according to claim 1, wherein the lance is arranged at a distance from both the existing first (5) the second (7) supply opening in the air burner (1), and the oxidant is supplied wholly or partially via the lance.

3. A method for combustion of a fuel, the method comprising the steps of:
- using an existing air burner (1), which air burner (1) comprises a first supply opening (5) for fuel and a second supply opening (7) for air, which first and second supply openings (5,7) open out into a combustion zone (3),
- supplying a gaseous low-grade fuel with a lower heating value (LHV) of less than 7.5 MJ/Nm$^3$ through the second supply opening (7) for air,
- supplying an oxidant comprising at least 85 percent by weight oxygen to the combustion zone (3) through a supply device for oxidant, and causing the gaseous low-grade fuel to be combusted with the oxidant in the combustion zone (3),
- wherein the supply device for oxidant is caused to be arranged so that oxidant is supplied wholly or partially through the existing first supply opening (5) for fuel in the air burner (1).

4. A method for combustion of a fuel, the method comprising the steps of:
- using an existing air burner (1), which air burner (1) comprises a first supply opening (5) for fuel and a second supply opening (7) for air, which first and second supply openings (5,7) open out into a combustion zone (3),
- supplying a gaseous low-grade fuel with a lower heating value (LHV) of less than 7.5 MJ/Nm$^3$ through the second supply opening (7) for air,
- supplying an oxidant comprising at least 85 percent by weight oxygen to the combustion zone (3) through a supply device for oxidant, and causing the gaseous low-grade fuel to be combusted with the oxidant in the combustion zone (3),
- wherein the combustion reaction between oxidant and the low-grade fuel is caused to heat an industrial furnace (14).

5. The method according to claim 1, wherein the amount of the low-grade fuel supplied per time unit at a certain predetermined power is caused to correspond to the amount of air which is supplied per time unit during conventional operation of the air burner (1).

6. The method according to claim 1, wherein, in an initial step, high-grade fuel or medium-grade fuel is introduced through the air burner (1) and combusted in the combustion zone (3) so that the combustion of the low-grade fuel is initiated.

7. The method according to claim 1, wherein at least half of the low-grade fuel is top gas from a blast furnace (10).

8. The method according to claim 7, wherein the flue gases are caused to originate from operation of a blast furnace (10) which is arranged in the same industrial plant as the air burner (1).

9. The method according to claim 1, wherein an existing recuperator, which during normal operation of the air burner (1) is used to preheat the combustion air, instead is used to preheat the low-grade fuel.

10. The method according to claim 1, wherein the lance is arranged at a distance from both the existing first (5) the second (7) supply opening in the air burner (1), and the oxidant is supplied wholly via the lance.

11. The method according to claim 1, wherein the lance is arranged at a distance from both the existing first (5) the second (7) supply opening in the air burner (1), and the oxidant is supplied partially via the lance.

12. The method according to claim 1, wherein the step of causing the low-grade fuel to be combusted with the oxidant in the combustion zone (3) heats an industrial furnace (14).

13. The method according to claim 1, wherein an amount of the low-grade fuel supplied per time unit at a predetermined power is caused to correspond to an amount of air which is supplied per time unit during conventional operation of the air burner (1).

14. The method according to claim 1, wherein, in an initial step, a high-grade fuel or a medium-grade fuel is introduced through the air burner (1) and combusted in the combustion zone (3) to initiate combustion of the low-grade fuel.

15. The method according to claim 1, wherein at least half of the low-grade fuel is top gas from a blast furnace (10).

16. The method according to claim 1, wherein an existing recuperator, which during normal operation of the air burner (1) is used to preheat the combustion air, instead is used to preheat the low-grade fuel.

* * * * *